United States Patent [19]
Farrington et al.

[11] Patent Number: 6,025,999
[45] Date of Patent: Feb. 15, 2000

[54] DUAL OUTPUT POWER SUPPLY AND METHOD OF OPERATION THEREOF

[75] Inventors: Richard W. Farrington, Rockwall; Mark E. Jacobs, Dallas; Hengchun Mao; Vijayan J. Thottuvelil, both of Plano, all of Tex.

[73] Assignee: Lucent Technologies Inc., Murray Hill, N.J.

[21] Appl. No.: 09/190,953

[22] Filed: Nov. 12, 1998

[51] Int. Cl.[7] .................................................. H02M 3/335
[52] U.S. Cl. ............................................. 363/16; 363/131
[58] Field of Search ................................ 363/15, 16, 40, 363/41, 95, 97, 131

[56] References Cited

U.S. PATENT DOCUMENTS 4,866,587  9/1989  Wadlington ................................ 363/16

OTHER PUBLICATIONS

U.S. Patent Application entitled "Power Supply Employing Circulating Capacitor and Method of Operation Thereof" by Mark E. Jacobs, et al., Filed on Nov. 12, 1998, U.S. Serial No. 09/191,441.

U.S. Patent Application entitled "Controller for Power Supply and Method of Operation Thereof" by Mark E. Jacobs, et al., filed on Nov. 12, 1998, U.S. Serial No. 09/191,442.

"A Unique Four Quadrant Flyback Converter" by Dhaval Dala: pp. 5–1—5–15: 1997.

"High Voltage Ring Generator" by Scott Lynch: Supertex, Inc.: pp. 1–12: 1997.

"Power Electronics and Variable Frequency Drives" by Bimal K. Bose: pp. 369–373: 1997.

"Power Electronics—Circuits, Devices, and Applications" by Muhammed H. Rashid: pp. 218–221: 1993.

"A New Family of Isolated Zero–Voltage–Switched Converters" by R. Farrington, M. M. Jovanovic and F. C. Lee: pp. 181–191.

"Four Quadrant Amplifier Based on the Flyback Topology" by Jim Walker: pp. 947–951: 1995.

"A Highly Efficient and Compact Inverter Using a PWM Switching Amplifier for Telecommunications Signals" by Kazuo Tsukamoto, Tatsuo Sakai and Toshiaka Yachi: pp. 147–152: 1998.

*Primary Examiner*—Matthew Nguyen

[57] ABSTRACT

A power supply and a method of operating the same. In one embodiment, the power supply includes: (1) a DC-DC converter having an isolation transformer that conveys an alternating voltage of about a first frequency between a primary winding and at least one secondary winding thereof and (2) a four-quadrant inverter, coupled to one of the at least secondary winding, that converts a portion of the alternating voltage into a waveform having about a second frequency that is less than the first frequency, including: (2a) a bi-directional switch, coupled between an input and an output of the four-quadrant inverter and (2b) a controller, coupled to the switch, that activates the switch to couple the input to the output during a portion of a switching cycle of the alternating voltage to change voltages in the waveform.

20 Claims, 3 Drawing Sheets

DUAL OUTPUT POWER SUPPLY AND METHOD OF OPERATION THEREOF

BACKGROUND OF THE INVENTION

Telecommunication devices typically alert customers to an incoming call by providing ringing signals, dial tones and busy signals. A centrally-located alternating current (AC) ringinig signal generator provides the necessary power to drive a ringer or audible tone source to create the desired acoustic signals. Today, electronic oscillators usually serve as ringing signal generators. The ringing signal generators are often located with the centralized switching equipment. Typical ringing signal generators produce an alternating voltage ringing signal having a constant frequency of about 16 to 30 hertz and a voltage of about 70 volts RMS.

Older telephone ringers include a series-parallel winding having an armature that drives a bell clapper. The ringing signal generator drives the winding. The winding requires a certain minimum drive current to provide sufficient magnetomotive force to drive the bell clapper. Because the winding has a nonliner response to drive current, the current waveform is often asymmetrical and tends to be peaked in one polarity direction. Also, due to reactive impedances in the winding, the drive current tends to be out of phase with the drive voltage. Moreover, operation of the winding requires bi-directional power flow to accommodate the reactance of the winding. More recent telephone ringers are completely electronic and, depending upon their design, may or may not require significant drive currents to operate properly.

In the familiar wire-based telecommunications systems, a central ringing signal generator typically provides power to the different ringers served by the systems over the wire pair normally used to provide voice communications. New telecommunications systems such as an Optical Network Unit used in fiber-to-home applications, however, require a different approach. Since fiber optic cables are unable to carry electrical current, the fiber-based systems are unable to employ the central ringing signal generator. A local ringer circuit is therefore required to generate the ringing signal to ring the telephones.

Four quadrant inverters are often employed to generate the local ringing signal. Currently, isolated, low power four quadrant inverters that process bi-directional voltage and current are sometimes implemented with a dedicated transformer, three independent active switches and a complex control scheme. While this topology allows the recycling of power in positive or negative voltage or current modes, the three switches should be operated based on instantaneous voltage and current information, requiring a complex control process. Complex custom logic circuits are typically required to control the individual active switches based on a polarity of the output voltage and a direction of the current flow. See, for example, Dhaval Dalal, "A Unique Four Quadrannt Flyback Converter," published by linitrode Corporation in "Power Supply Design Seminar" (1997), which is incorporated herein by reference.

Another telephone ringer topology is described in U.S. Pat. No. 4,866,587, which issued on Sep. 12, 1989 to Wadlington and is entitled "Electronic Ringing Signal Generator." The aforementioned reference is incorporated herein by reference. Wadlington discloses a converter topology that allows the recycling of the output power back to the input source (i.e., a bi-directional power flow). The converter of Wadlington, however, requires two inverters, a first inverter connected to a primary winding of the transformer and a second inverter connected to a secondary winding of the transformer. The first and second inverters each operate in only one direction.

Still another telephone ringer topology is described in Application Note AN-H35, entitled "High Voltage Ring Generator" published by Supertex Inc. (1997). The aforementioned reference is incorporated herein by reference. The Application Note describes the operation of a Supertex HV441 switchmode ring generator integrated circuit (IC). The ring generator disclosed by Supertex, however, not only requires a complex control circuit to operate, but also requires the power supply to develop high voltage DC buses that exceed a peak positive and negative output voltage of the ringer. Further, because the ring generator is embodied in an IC, the peak output voltage is limited by the inherent breakdown characteristics of the silicon process employed to produce the IC.

As telephones incorporate a number of advanced features, such as wireless operation, messaging, networking or video transmission capabilities, DC power of various voltages are also required to operate the electronic circuits associated with the advanced features. The fiber-based systems should thus ideally provide both the AC ringing signal to ring the telephones and the DC power required to operate the electronic circuits.

Accordingly, what is needed in the art is a converter topology that provides both AC and DC voltages and permits bi-directional four-quadrant power flow of the AC voltage, thereby overcoming the limitations of the prior art.

SUMMARY OF THE INVENTION

To address the above-discussed deficiencies of the prior art, the present invention provides a power supply and a method of operating the same. In one embodiment, the power supply includes: (1) a DC-DC converter having an isolation transformer that conveys an alternating voltage of about a first frequency between a primnary winding and at least one secondary winding thereof and (2) a four-quadrant inverter, coupled to one of the at least one secondary winding, that converts a portion of the alternating voltage into a waveform having about a second frequency that is less than the first frequency, including: (2a) a bi-directional switch, coupled between an input and an output of the four-quadrant inverter and (2b) a controller, coupled to the switch, that activates the switch to couple the input to the output during a portion of a switching cycle of the alternating voltage to change voltages in the waveform.

The present invention therefore introduces the broad concept of coupling a four-quadrant inverter to a winding of an isolation transformer of a DC-DC converter. The four-quadrant inverter receives the portion of the alternating voltage from the DC-DC converter and converts the portion into a waveform having about a second frequency less than a first frequency of the alternating voltage.

In one embodiment of the present invention, the portion of the switching cycle is of variable temporal duration. The controller activates the switch to selectively couple the input and output of the inverter to change the voltage of the waveform.

In one embodiment of the present invention, the waveform is sinusoidal. In a related embodiment, the waveform is bipolar. In a preferred embodiment, the waveform possesses a bipolar output voltage and is capable of sourcing and sinking power to a reactive load.

In one embodiment of the present invention, the second frequency is 20 hertz. Alternatively, the second frequency may be 16 hertz. Of course, the second frequency may be any frequency that is substantially less than the first frequency.

In one embodiment of the present invention, the bi-directional switch includes series-coupled first and second metal oxide semiconductor field-effect transistors (MOSFETs). Those skilled in the art are familiar with MOSFETs. Of course, the use of other implementations of the bi-directional switch is well within the broad scope of the present invention.

In one embodiment of the present invention, the four-quadrant inverter further includes a second bi-directional switch coupled to the second secondary winding. The second bi-directional switch provides a path for circulating current to the output of the four-quadrant inverter.

In one embodiment of the present invention, the four-quadrant inverter further includes an output capacitor coupled across the output. The output capacitor filters the waveform substantially reducing switching frequency ripple therein.

In one embodiment of the present invention, the DC-DC converter further has an inverter selected from the group consisting of an asymmetrical half bridge, a half bridge, a full bridge, a forward, a flyback, a Sepic and a Zeta. Conventional inverter topologies are familiar to those skilled in the art. Of course, the present invention is not limited to the inverter topologies disclosed herein.

In one embodiment of the present invention, the DC-DC converter further has a rectifier selected from the group consisting of a half wave rectifier, a full wave rectifier, a hybridge rectifier, a multiple transformer rectifier and a flyback rectifier. Those skilled in the art will realize, of course, that the use of other rectifier topologies is well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
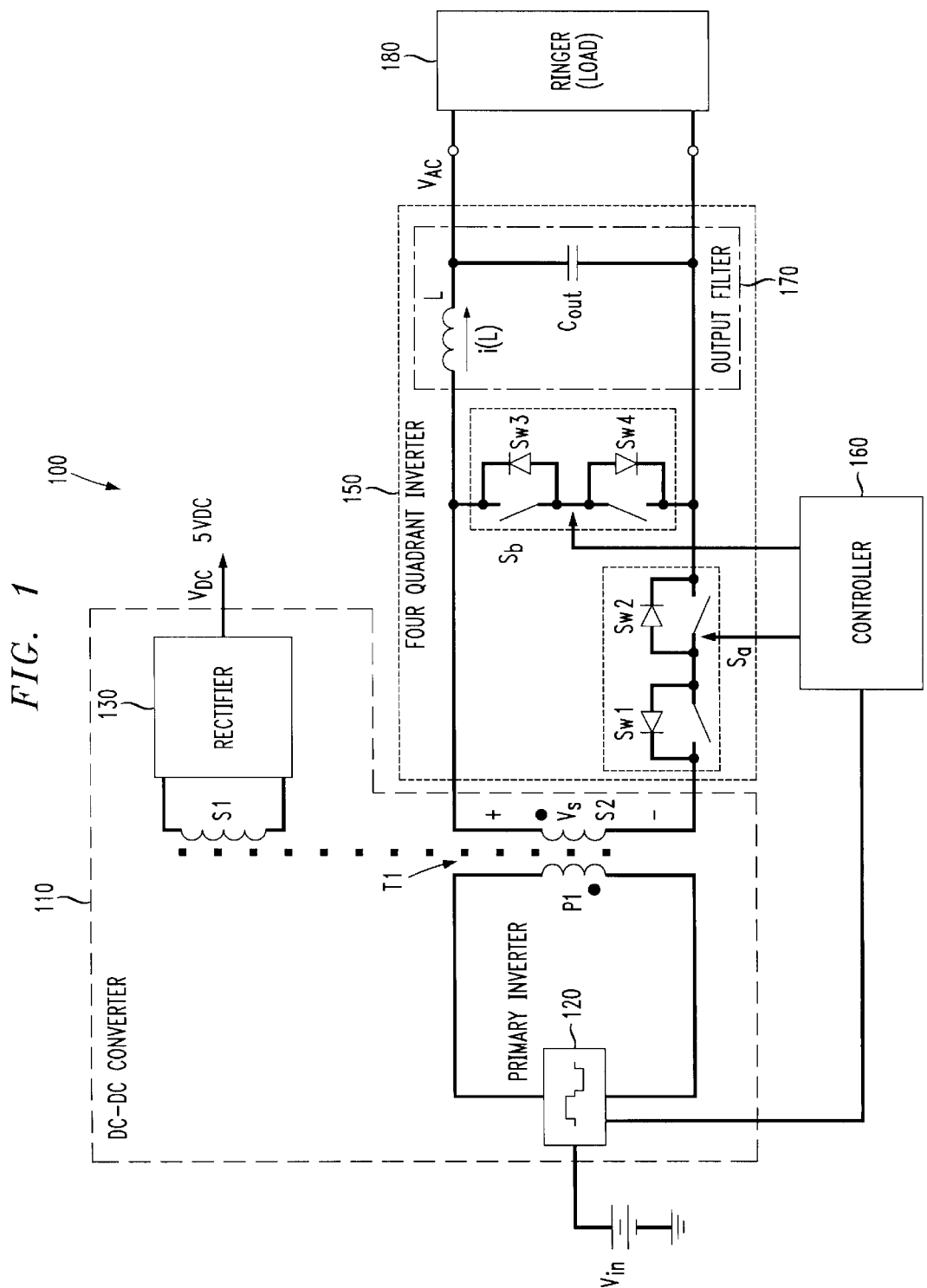
FIG. 1 illustrates a schematic diagram of an embodiment of a power supply constructed according to the principles of the present invention.

Referring initially to FIG. 1, illustrated is a schematic diagram of an embodiment of a power supply 100 constructed according to the principles of the present invention. The power supply 100 includes a DC-DC converter 110 that receives a DC input voltage Vin at an input of the power supply 100 and generates a DC output voltage $V_{DC}$ at a first output of the power supply 100. The power supply 100 further includes a four-quadrant inverter 150, coupled to the DC-DC converter 110, that generates an AC output waveform having an AC output voltage $V_{AC}$ at a second output of the power supply 100.

The DC-DC converter 110 includes an inverter (primary inverter 120), such as, a full-bridge, half-bridge, forward, flyback, Sepic or Zeta inverter, coupled to an input of the power supply 100. Conventional inverter topologies are familiar to those skilled in the art and, as a result, the primary inverter 120 will not be described in detail. The DC-DC converter 110 further includes a transformer T1 having a primary winding P1 and a first secondary winding S1. The DC-DC converter 110 still further includes a rectifier 130 (e.g., a half wave rectifier, full wave rectifier, hybridge rectifier, multiple transformer rectifier or flyback rectifier) coupled to the first secondary winding S1. Conventional rectifier topologies are familiar to those skilled in the art.

In the illustrated embodiment, the transformer T1 has a second secondary winding S2. The four-quadrant inverter 150 is thus coupled to the DC-DC converter 110 via the second secondary winding S2. Of course, the principles of the present invention may also be employed to advantage in topologies having more than one transformer. Further, while the present embodiment illustrates a transformer T1 having first and second secondary windings S1, S2, those skilled in the art will realize that converters having one secondary winding are also within the broad scope of the present invention.

The four-quadrant inverter 150 includes a primary bi-directional (four-quadrant) switch Sa having a first unidirectional switch Sw1 and a second unidirectional switch Sw2. The primary bi-directional switch Sa is coupled between an input and an output of the four-quadrant inverter 150. In the illustrated embodiment, the primary bi-directional switch Sa is coupled between the second secondary winding S2 and the second output of the power supply 100.

The four-quadrant inverter 150 further includes an auxiliary bi-directional switch Sb having a third unidirectional switch Sw3 and a fourth unidirectional switch Sw4. While the primary and auxiliary bi-directional switches Sa, Sb are illustrated as opposing pairs of unidirectional switches (e.g., MOSFETs), those skilled in the art will realize that each of the primary and auxiliary bi-directional switches Sa, Sb may be replaced by a single bi-directional switch. The four-quadrant inverter 150 further includes a controller 160 coupled to the primary and auxiliary bi-directional switches Sa, Sb. In the embodiment illustrated and described, the first and second unidirectional switches Sw1, Sw2 of the primary bi-directional switch Sa are concurrently switched. Likewise, the third and fourth unidirectional switches Sw3, Sw4 of the auxiliary bi-directional switch Sb are also concurrently switched. Of course, the controller 160 may switch each of the first, second, third and fourth unidirectional switches Sw1, Sw2, Sw3, Sw4 individually, based on a level of current therethrough. The four-quadrant inverter 150 still further includes an output filter 170 having an inductor L and an output capacitor Cout. In an alternative embodiment, the output filter 170 may have a filter resistor in lieu of the inductor L. Of course, the output filter 170 is not necessary to the present invention. The four-quadrant inverter 150 provides the AC output waveform to a load 180 at the second output of the power supply 100. While the load 180 is illustrated as a ringer, those skilled in the art realize that the four-quadrant inverter 150 may be used to drive loads other than ringers.

The power supply 100 operates as follows. The primary inverter 120 switches to create an alternating voltage that is applied to the primary winding P1. In the illustrated embodiment, the source of input voltage provides the DC input voltage Vin. In addition, the primary inverter 120 is controlled by pulse-width modulation (PWM). The alternating voltage, therefore, possesses a substantially rectangular and bipolar waveform. Those skilled in the art are familiar with conventional PWM techniques and the waveforms resulting therefrom and, as a result, the operation the primary inverter 120 will not be further described. The transformer T1 conveys the alternating voltage between the primary winding P1 and the first and second secondary windings S1, S2. The rectifier 130 rectifies the alternating voltage from the first secondary winding S1 to provide the DC output voltage $V_{DC}$ at the first output of the power supply 100.

In one embodiment of the present invention, the rectifier 130 contains an output filter that substantially reduces switching frequency ripple in the output voltage $V_{DC}$. Of course, the output filter is not required by the present invention. In one embodiment of the present invention, the switching of the primary inverter 120 is regulated to maintain the DC output voltage $V_{DC}$ at a substantially constant voltage. In another embodiment, the primary inverter 120 is free-running, the rectifier 130 switching to regulate the DC output voltage $V_{DC}$. Of course, the DC output voltage $V_{DC}$ may be unregulated.

The four-quadrant inverter 150 is coupled to the second secondary winding S2. The four-quadrant inverter 150 receives an alternating voltage from the second secondary winding S2 and develops therefrom an AC waveform. In the illustrated embodiment, the alternating voltage from the second secondary minding S2 is at about a first frequency (e.g., 100 kHz) and exhibits both positive and negative voltages in each switching cycle of the primary inverter 120. For example, during a primary period D of the switching cycle, the alternating voltage from the second secondary winding S2 may be substantially positive. Then, during an auxiliary period 1–D of the switching cycle, the alternating voltage from the second secondary winding S2 may be substantially negative. The controller 160 switches the primary and auxiliary bi-directional switches Sa, Sb in a substantially complementary manner to transfer a portion of the alternating voltage from the second secondary winding S2 to the output filter 170. In a preferred embodiment, the conduction periods of the primary and auxiliary switches Sa, Sb exhibit a small overlap. While the overlap assures a continuous conduction path for current in the inductor L, those skilled in the art will realize that the overlap is not required to operate the four-quadrant inverter 150. In an alternative embodiment, a small delay may be provided between the conduction periods of the primary and auxiliary switches Sa, Sb. If the small delay is employed, the parasitic capacitances of the primary and auxiliary switches Sa, Sb may provide the conduction path for the current in the inductor L.

The primary bi-directional switch Sa may, for example, conduct during the primary period D of the switching cycle to couple the positive voltage on the second secondary winding S2 to the output filter 170. Alternatively, the primary bi-directional switch Sa may conduct during the auxiliary period 1–D of the switching cycle to couple the negative voltage on the second secondary winding S2 to the output filter 170. Of course, the primary bi-directional switch Sa may conduct during both the primary and auxiliary periods D, 1–D of the switching cycle. In the illustrated embodiment, the controller 160 synchronizes the primary and auxiliary bi-directional switches Sa, Sb by monitoring the switching of the primary inverter 120. During the conduction period of the primary bi-directional switch Sa, the alternating voltage from the second secondary winding S2 provides power to both the inductor L of the output filter 170 and the load 180. During the nonconduction period of the primary bi-directional switch Sa, the alternating voltage from the second secondary winding S2 is isolated from the second output. The auxiliary bi-directional switch Sb now conducts to provide a freewheeling path for the inductor current. The auxiliary bi-directional switch Sb thus allows the inductor current to circulate toward the second output when the primary bi-directional switch Sa is nonconducting. The output filter 170 then smooths and filters and dampens the voltage fluctuations to thereby provide a substantially smooth AC output waveform at the second output.

Figure 2:
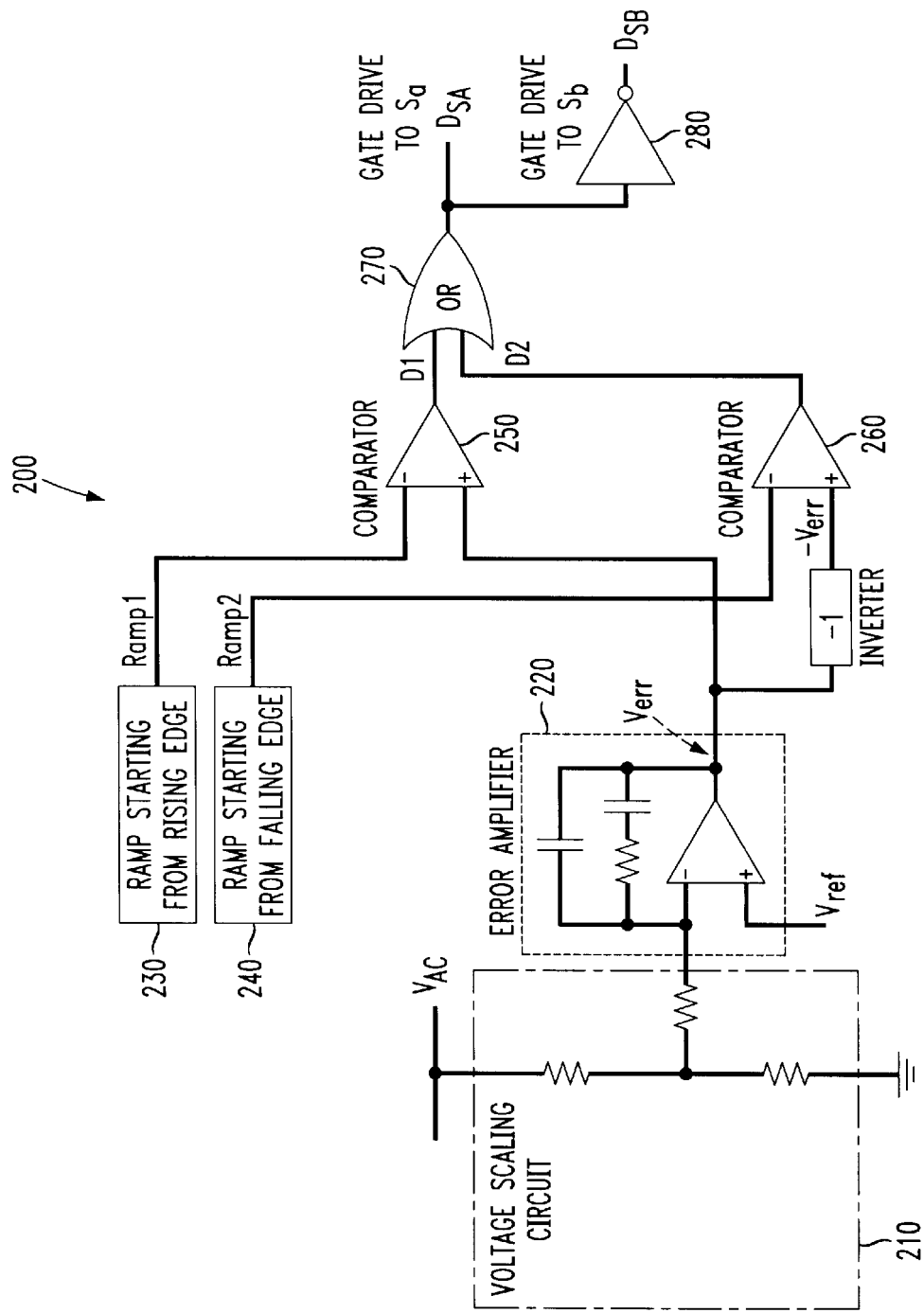
FIG. 2 illustrates an exemplary schematic diagram of a controller for operating the primary and auxiliary bi-directional switches of the four-quadrant inverter of FIG. 1.

Turning now to FIG. 2, illustrated is an exemplary schematic diagram of a controller 200 for operating the primary and auxiliary bi-directional switches Sa, Sb of the four-quadrant inverter 150 of FIG. 1. With continuing reference to FIG. 1, the controller 200 is coupled to the primary inverter 120 and monitors the switching transitions thereof to synchronize the four-quadrant inverter 150 to the primary inverter 120. In the illustrated embodiment, the controller 200 activates the primary and auxiliary bi-directional switches Sa, Sb to couple the input and output of the four-quadrant inverter 150 during a primary period or an auxiliary period 1–D of a switching cycle of the alternating voltage. By adjusting a conduction period of the primary and auxiliary bi-directional switches, Sa, Sb, the controller 200 may change the AC output voltage $V_{AC}$ of the AC output waveform.

The controller 200 includes a voltage scaling circuit 210 that scales the AC output voltage $V_{AC}$ to develop a scaled AC signal representative of the AC output waveform. The controller 200 further includes an error amplifier 220 that receives the scaled AC signal and a reference signal Vref and develops therefrom an error signal Verr. In the illustrated embodiment, the reference signal Vref is a substantially sinusoidal waveform having a desired frequency less than a frequency of the alternating voltage. More specifically, the frequency of the reference signal Vref is substantially equal to the desired output frequency. While the reference signal Vref is illustrated as a sinusoidal waveforn, those skilled in the art realize that the principles of the present invention may also advantageously employ reference signals having non-sinusoidal waveforms. Additionally, the error amplifier 220 is illustrated as having a conventional capacitor-resistor-capacitor feedback network that allows the controller 200 to compensate for variations in the four-quadrant inverter 150 of FIG. 1. Those skilled in the art will realize, however, that the use of other compensation schemes is well within the broad scope of the present invention. The error amplifier 220 compares the scaled AC signal to the reference signal Vref to develop an error signal Verr representing a difference between the AC output voltage $V_{AC}$ and the reference signal Vref. The error signal Verr may be a positive voltage or a negative voltage. In the illustrated embodiment, the error signal Verr is positive when the AC output voltage $V_{AC}$ lower than desired and negative when the AC output voltage $V_{AC}$ is higher than desired. In other embodiments, the polarity of the error signal Verr may be reversed, depending on other circuitry within the controller 200.

The controller 200 further includes first and second ramp generators 230, 240 that generate first and second ramp signals, Ramp1, Ramp2, respectively. In the illustrated embodiment, the first ramp signal Ramp1 is synchronized to a rising edge of the alternating voltage applied to the isolation transformer T1 by the primary inverter 120. The second ramp signal Ramp2 is synchronized to a falling edge of the alternating voltage. In a preferred embodiment, the first and second ramp signals Ramp1, Ramp2 have substantially equal slopes. Of course, the first and second ramp signals Ramp1, Ramp2 may have different slopes. The controller 200 further includes a first comparator 250 that receives the first ramp signal Ramp1 and the error signal Verr and develops therefrom a first drive signal D1. The controller 200 further includes a second comparator 260 that receives the second ramp signal Ramp2 and an inverse of the error signal −Verr and develops therefrom a second drive signal D2. The controller 200 further includes an OR gate 270 that selects a primary drive signal $D_{SA}$ from the first and second drive signals D1, D2 and applies the primary drive signal $D_{SA}$ to the primary bi-directional switch Sa. The controller 200 still further includes a NOT gate 280, coupled to the output of the OR gate 270, that inverts the primary drive signal $D_{SA}$ to produce the auxiliary drive signal $D_{SB}$ for driving the auxiliary bi-directional switch Sb.

Figure 3A:
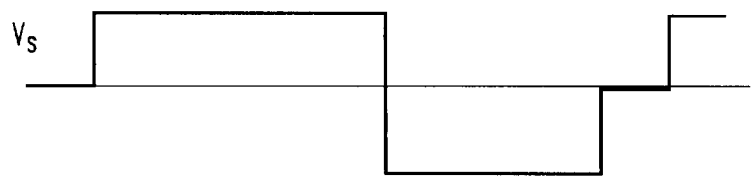
FIGS. 3A through 3E illustrate graphical representations of a plurality of switching transitions of selected elements of the power supply of FIG. 1.
Figure 3B:
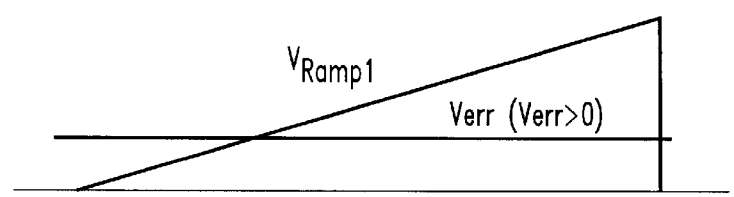
Figure 3C:
Figure 3D:
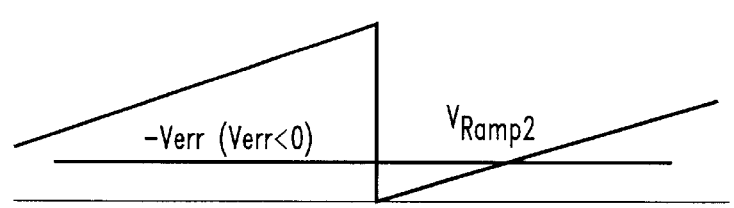
Figure 3E:

Turning now to FIGS. 3A through 3E, and with continuing reference to the preceding FIGUREs, illustrated are graphical representations of a plurality of switching transitions of selected elements of the power supply 100 of FIG. 1. More specifically, FIG. 3A illustrates the alternating voltage Vs across the second secondary winding S2 of the isolation transformer T1. FIG. 3B illustrates a first ramp voltage Vramp1 of the first ramp signal Ramp1 and the error voltage Verr. FIG. 3C illustrates the first drive signal D1 produced by the first comparator 250. FIG. 3D illustrates a second ramp voltage Vramp2 of the second ramp signal Ramp2, along with the error voltage Verr. FIG. 3E illustrates the second drive signal D2 produced by the second comparator 260.

FIGS. 3A, 3B and 3C collectively illustrate a condition wherein the output voltage Vout is lower than desired. In this case, the error voltage Verr is positive and the first comparator 250 generates the first drive signal D1 for as long as the error voltage Verr is greater than the first ramp voltage Vramp1. In the embodiment illustrated and described with respect to FIG. 1, the polarity of the alternating voltage is negative during the primary period D and positive during the auxiliary period 1−D. The first drive signal D1, therefore, causes the primary bi-directional switch Sa to close during the auxiliary period 1−D to increase the output voltage Vout.

FIGS. 3A, 3D and 3E collectively illustrate a condition wherein the output voltage Vout is higher than desired. Here, the error voltage Verr is negative, so the inverted error voltage −Verr is positive. The second comparator 260, therefore, generates the second drive signal D2 as long as the inverted error voltage −Verr is greater than the second ramp voltage Vramp2. The second drive signal D2 causes the primary bi-directional switch Sa to close during the primary period D to decrease the output voltage Vout.

In either case, the OR gate 270 selects the primary drive signal from the first and second drive signals D1, D2 and applies the primary drive signal to the primary bi-directional switch Sa. The NOT gate 280 then inverts the primary drive signal to produce the auxiliary drive signal for driving the auxiliary bi-directional switch Sb.

Those skilled in the art should understand that the previously described embodiments of the power supply and controller are submitted for illustrative purposes only and other embodiments capable of converting a portion of an alternating voltage generated by a DC-DC converter into a waveform having about a second frequency less than a first frequency of the alternating voltage are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. Also, the concepts of the present invention may be employed with other circuit topologies.

For a better understanding of power electronics, including power supplies and four-quadrant inverters, see *Power Electronics: Converters, Applications and Designs*, by N. Mohan, T. M. Undeland and W. P. Robbins, John Wiley & Sons Publishing Company (1989); *Power Electronics and Variable Frequency Drives*, by B. K. Bose, IEEE Press (1997); *Power Electronics: Circuits, Devices, and Applications, Second Edition*, by M. H. Rashid, Prentice Hall (1993); and *A New Family of Isolated Zero-Voltage-Switched Converters*, by R. Farrington, M. M. Jovanovic and F. C. Lee, in *Proceedings of the Power Electronics Society Conference* (1991). The aforementioned references are incorporated herein by reference.

Although the present invention has been described in detail, those skilled in the art should understand that they can make various changes, substitutions and alterations herein without departing from the spirit and scope of the invention in its broadest form.

What is claimed is:

1. A power supply, comprising:
   a DC-DC converter having an isolation transformer that conveys an alternating voltage of about a first frequency between a primary winding and at least one secondary winding thereof; and
   a four-quadrant inverter, coupled to one of said at least one secondary winding, that converts a portion of said alternating voltage into a waveform having about a second frequency that is less than said first frequency, including:
      a bi-directional switch, coupled between an input and an output of said four-quadrant inverter, and
      a controller, coupled to said switch, that activates said switch to couple said input to said output during a portion of a switching cycle of said alternating voltage to change voltages in said waveform.

2. The power supply as recited in claim 1 wherein said portion of said switching cycle is of variable temporal duration.

3. The power supply as recited in claim 1 wherein said waveform is sinusoidal.

4. The power supply as recited in claim 1 wherein said waveform is bipolar.

5. The power supply as recited in claim 1 wherein said second frequency is 20 hertz.

6. The power supply as recited in claim 1 wherein said bi-directional switch comprises series-coupled first and second metal oxide semiconductor field-effect transistors (MOSFETs).

7. The power supply as recited in claim 1 wherein said four-quadrant inverter further includes a second bi-directional switch coupled to said one of said at least one secondary winding.

8. The power supply as recited in claim 1 wherein said four-quadrant inverter further includes an output capacitor coupled across said output.

9. The power supply as recited in claim 1 wherein said DC-DC converter further has an inverter selected from the group consisting of:
   an asymmetrical half bridge,
   a half bridge,
   a full bridge,
   a forward,
   a flyback,
   a Sepic, and
   a Zeta.

10. The power supply as recited in claim 1 wherein said DC-DC converter further has a rectifier selected from the group consisting of:
   a half wave rectifier,
   a full wave rectifier,
   a hybridge rectifier,
   a multiple transformer rectifier, and
   a flyback rectifier.

11. A method of operating a power supply, comprising:
   conveying an alternating voltage of about a first frequency between a primary winding and at least one secondary winding of an isolation transformer of a DC-DC converter;
   transferring a portion of said alternating voltage to one of said at least one secondary winding coupled to said isolation transformer; and
   converting said portion of said alternating voltage into a waveform having about a second frequency that is less than said first frequency with a four-quadrant inverter, coupled to said one of said at least one secondary winding, that includes:
      a bi-directional switch, coupled between an input and an output of said four-quadrant inverter, and
      a controller, coupled to said switch, that activates said switch to couple said input to said output during a portion of a switching cycle of said alternating voltage to change voltages in said waveform.

12. The method as recited in claim 11 wherein said portion of said switching cycle is of variable temporal duration.

13. The method as recited in claim 11 wherein said waveform is sinusoidal.

14. The method as recited in claim 11 wherein said waveform is bipolar.

15. The method as recited in claim 11 wherein said second frequency is 20 hertz.

16. The method as recited in claim 11 wherein said bi-directional switch comprises series-coupled first and second metal oxide semiconductor field-effect transistors (MOSFETs).

17. The method as recited in claim 11 wherein said four-quadrant inverter further includes a second bi-directional switch coupled across said one of said at least one secondary winding.

18. The method as recited in claim 11 wherein said four-quadrant inverter further includes a capacitor coupled across said output.

19. The method as recited in claim 11 further comprising generating said alternating voltage with an inverter selected from the group consisting of:
   an asymmetrical half bridge,
   a half bridge,
   a full bridge,
   a forward,
   a flyback,
   a Sepic, and
   a Zeta.

20. The method as recited in claim 11 further comprising rectifying said alternating voltage with a rectifier selected from the group consisting of:
   a half wave rectifier,
   a full wave rectifier,
   a hybridge rectifier,
   a multiple transformer rectifier, and
   a flyback rectifier.

* * * * *